United States Patent
Deker et al.

(10) Patent No.: US 9,530,321 B2
(45) Date of Patent: Dec. 27, 2016

(54) FLIGHT MANAGEMENT METHOD AND SYSTEM

(71) Applicant: THALES, Courbevoie (FR)

(72) Inventors: Guy Deker, Cugnaux (FR); Michel Roger, Valence (FR); Bruno Aymeric, St Medard en Jalles (FR)

(73) Assignee: Thales, Courbevoie (FR)

(*) Notice: Subject to any disclaimer, the term of this patent is extended or adjusted under 35 U.S.C. 154(b) by 13 days.

(21) Appl. No.: 14/627,645

(22) Filed: Feb. 20, 2015

(65) Prior Publication Data

US 2015/0262490 A1  Sep. 17, 2015

(30) Foreign Application Priority Data

Feb. 21, 2014  (FR) ...................................... 14 00457

(51) Int. Cl.
*G01C 23/00* (2006.01)
*G08G 5/00* (2006.01)
*G05D 1/10* (2006.01)

(52) U.S. Cl.
CPC ............ *G08G 5/0039* (2013.01); *G05D 1/101* (2013.01); *G08G 5/0013* (2013.01); *G08G 5/0021* (2013.01); *G08G 5/0047* (2013.01); *G08G 5/0052* (2013.01); *G08G 5/0095* (2013.01)

(58) Field of Classification Search
CPC ... G08C 5/0021; G08C 5/0039; G08C 5/0047; G08C 5/0095; G01C 23/00
USPC .................................................. 701/3, 10, 14
See application file for complete search history.

(56) References Cited

U.S. PATENT DOCUMENTS

| | | | |
|---|---|---|---|
| 2005/0261808 A1* | 11/2005 | Artini | G01C 23/00 701/3 |
| 2006/0085101 A1* | 4/2006 | Berard | G01C 23/00 701/3 |
| 2010/0324812 A1 | 12/2010 | Sacle et al. | |
| 2014/0012436 A1 | 1/2014 | Coulmeau et al. | |

FOREIGN PATENT DOCUMENTS

| | | |
|---|---|---|
| EP | 1600733 A1 | 11/2005 |
| FR | 2921151 A1 | 3/2009 |
| FR | 2945622 A1 | 11/2010 |
| FR | 2993063 A1 | 1/2014 |

* cited by examiner

Primary Examiner — Thomas G Black
Assistant Examiner — Luke Huynh
(74) Attorney, Agent, or Firm — Baker & Hostetler LLP

(57) ABSTRACT

A method and system, for flight management of an aircraft flying on a trajectory shifted with respect to a flight plan comprising a plurality of constrained waypoints, comprises a step of determining and displaying at least one point of the trajectory, termed decision point, beyond which the aircraft can no longer rejoin a constrained waypoint of the flight plan by determining a point of intersection between the trajectory and a rejoining trajectory steering towards the selected constrained waypoint, the rejoining trajectory complying with at least one predefined criterion.

14 Claims, 12 Drawing Sheets

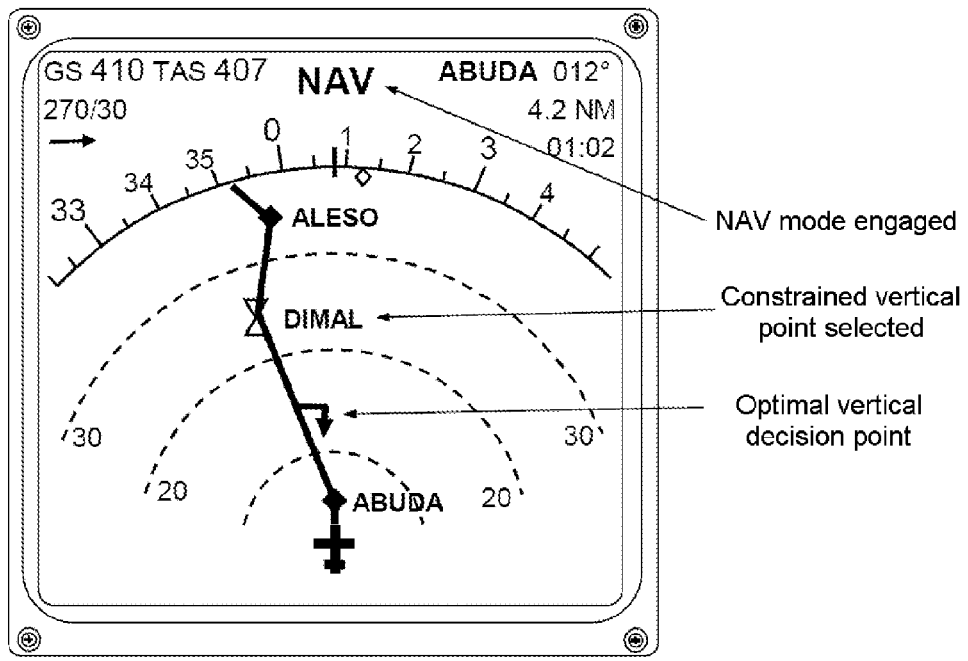
FIG.10
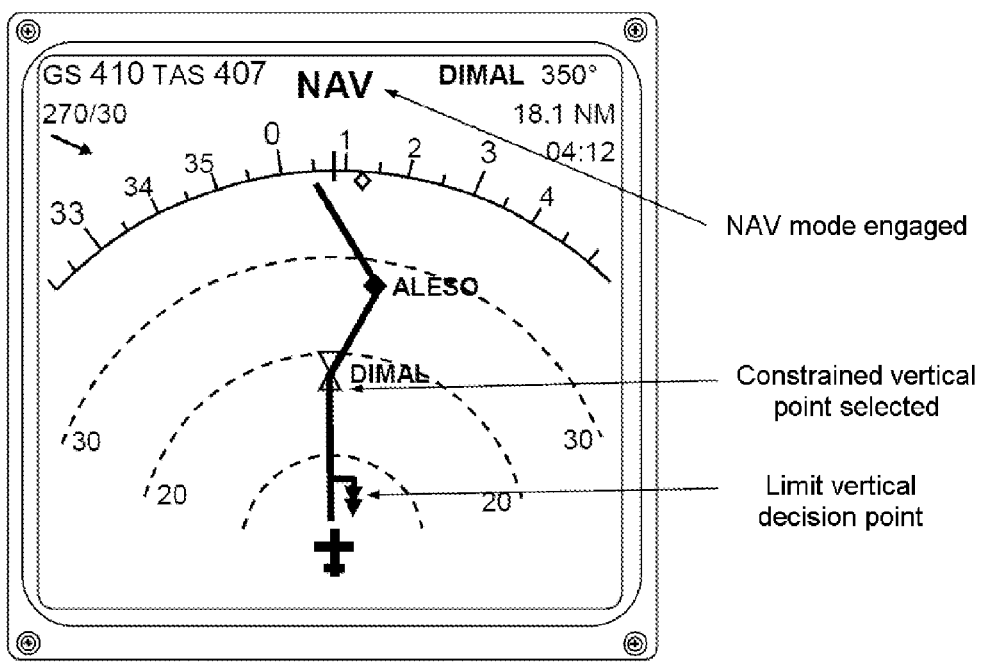
FIG.10 bis

FIG.12 bis

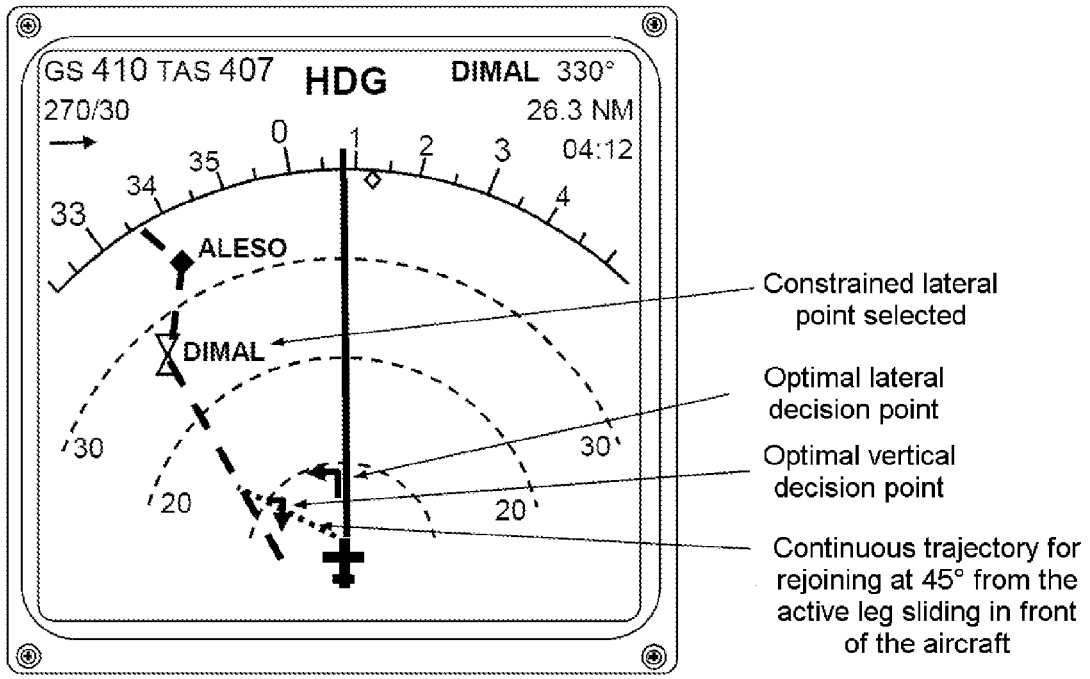
FIG.14
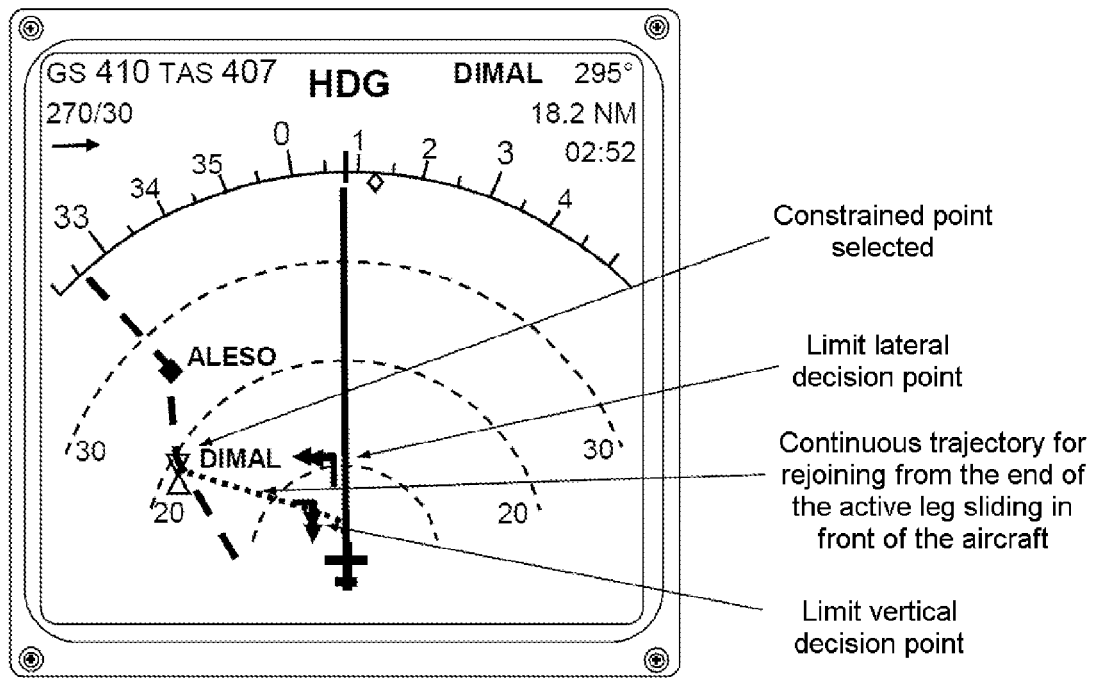
FIG.14 bis

FLIGHT MANAGEMENT METHOD AND SYSTEM

CROSS-REFERENCE TO RELATED APPLICATIONS

This application claims priority to foreign French patent application No. FR 1400457, filed on Feb. 21, 2014.

FIELD OF THE INVENTION

The invention lies in the field of flight management, in particular the invention relates to the management of the rejoining of a flight plan from a trajectory shifted with respect to this flight plan.

BACKGROUND

Flight management systems (known by the acronym FMS) designed to prepare and thereafter automatically slave an aircraft to a flight plan are known in the prior art. The flight plan is also known by the expression "route" or "3D trajectory". The mode of operation in which the flight management system slaves an aircraft to a flight plan is also known by the expression "managed guidance mode". In certain situations the air traffic controller situated on the ground is required to ask the aircraft to leave its flight plan by a mode differing from the so-called "managed" mode. Managed mode is understood to mean a mode in which the aircraft is guided by the flight management system and the automatic pilot according to a three-dimensional trajectory or 3D trajectory. This happens for example when the controller gives a particular flight instruction to the aircraft for a short moment during which the aircraft no longer follows the 3D trajectory. The controller may give this instruction so as to ensure correct separation of aircraft and thus maintain a sustained rate of aircraft arrival. This flight instruction is for example an indication of speed, altitude, heading or vertical speed that must be complied with by the aircraft. During the application of the controller's instruction, the flight management system assumes, in order to carry out these various calculations, that the aircraft will return immediately to the flight plan and immediately resume tracking the scheduled vertical profile and scheduled speed setting. Thus transit time prediction calculations, performed by the flight management system, with regard to the points of the flight plan, are marred by an error proportional to the time during which the pilot performs his flight while following the air traffic controller's instruction and without rejoining the planned route and profile straight away.

In addition to these errors in the calculations of the flight management system, current flight management systems do not allow the pilot to ascertain up to what moment he can follow the air traffic controller's instructions while being able thereafter to comply with the next constraints of the flight plan. These constraints are in particular an obligation to transit a point of the flight plan, or an obligation to comply with an altitude, transit time or speed at certain points or in certain zones of the flight plan.

The notion of constraint refers to an obligation or restriction of the freedom in the manoeuvres of the aircraft that the latter absolutely must comply with. The criterion refers to a way of achieving this constraint. Within the framework of this invention the constraints are an obligation of transit in terms of position, altitude, transit time or speed with regard to certain points of the flight plan and the criteria represent the aircraft's guidance characteristics for carrying out the transits through these points.

SUMMARY OF THE INVENTION

The invention is aimed at remedying the problems cited previously by proposing a method making it possible to aid the flight management of an aircraft complying with these constraints when the latter follows a trajectory shifted from the flight plan.

The subject of the present invention is therefore a method of flight management of an aircraft flying on a trajectory shifted with respect to a flight plan comprising a plurality of constrained waypoints, the said method comprising:
  a step of determining at least one point of the said trajectory, termed decision point, beyond which the aircraft can no longer rejoin a constrained waypoint of the said flight plan by determining a point of intersection between the said trajectory and a rejoining trajectory steering towards the said selected constrained waypoint, the said rejoining trajectory complying with at least one predefined criterion.

Advantageously the method comprises a preliminary step of selecting the said constrained waypoint:
  as being a point of the flight plan termed active point situated ahead of the aircraft,
  or as being a point of the flight plan having a constraint and situated ahead of the aircraft,
  or as being a point of the flight plan having a constraint and situated ahead of a point, defined by the pilot, on the trajectory of the aircraft. The constraints which may be associated with this point termed constrained waypoint are for example an altitude, a speed or a time that must be complied with by the aircraft when transiting this point,
  or as being a point of the flight plan selected by the pilot and situated ahead of the aircraft.

Advantageously the method comprises a step of displaying at least one decision point.

Advantageously the determining step comprises:
  a first step of determining at least one first point of the said trajectory, termed first decision point, from which the aircraft must rejoin the said flight plan while complying with at least one first criterion termed optimal criterion and
  a second step of determining at least one second point of the said trajectory, termed second decision point, from which the aircraft must rejoin the said flight plan while complying with at least one second criterion termed limit criterion, the said limit criterion being less restrictive than the said optimal criterion.

Advantageously at least one of the criteria depends on at least one parameter chosen from among:
  a first parameter representative of a horizontal rejoining angle between the flight plan and the rejoining trajectory,
  a second parameter representative of an angle of roll,
  a third parameter representative of a speed of the aircraft making it possible to increase the flight slope,
  a fourth parameter representative of the thrust of the engines of the aircraft,
  a fifth parameter representative of an extended configuration of the airbrakes.

Advantageously the method which is the subject of the invention carries out, as long as is valid the condition defined by the fact:

that the aircraft is not slaved to the lateral trajectory,
that the said aircraft does not diverge with respect to the destination,
that a lateral discrepancy between a position of the aircraft and an active flight plan exceeds a first threshold,
the following repetitive sequential steps:
a step of determining lateral divergence of the trajectory of the aircraft with respect to the active segment of the flight plan,
a step of selecting a lateral constrained waypoint of the flight plan towards which an aircraft must rejoin the flight plan,
the first determining step 201, suitable for determining a first lateral decision point making it possible for the first parameter to equal a first rejoining angle, termed optimal angle for rejoining the selected lateral constrained waypoint of the flight plan while satisfying the constraint attached therewith,
the displaying step suitable for displaying the first decision point,
a step of determining the passing of the first lateral decision point by the aircraft,
a step of emitting an alert indicating the passing of the first lateral decision point,
a step of determining whether the managed lateral guidance mode, making it possible to satisfy the lateral or vertical or temporal constraint of the constrained waypoint, is armed before transiting the first optimal decision point,
if the managed lateral guidance mode is armed a final step of engaging the previously armed managed lateral guidance mode allowing the rejoining of the constrained lateral point selected according to an optimal flight criterion,
if the managed lateral guidance mode is not armed,
a step of sequencing the selected lateral constrained waypoint of the flight plan,
a step of emitting an alert indicating that a lateral constraint is unsatisfied.

Advantageously the method comprises subsequent to the step of determining the arming of the managed lateral guidance mode, the following steps:
the second determining step suitable for determining a second lateral decision point making it possible for the first parameter to equal a second rejoining angle, termed limit angle for rejoining the selected lateral constrained waypoint of the flight plan,
the displaying step, suitable for displaying the second decision point,
a step of periodic calculation, updating and display of a trajectory for rejoining the selected constrained lateral point, from the aircraft,
a step of determining the armed status of the managed lateral guidance mode,
if the managed lateral guidance mode is armed a final step of rejoining the constrained lateral point selected according to a limit flight criterion,
if the managed lateral guidance mode is not armed,
a repetitive step of determining the passing of the second lateral decision point by the aircraft,
the step of sequencing the selected lateral constrained waypoint of the flight plan,
the step of emitting an alert indicating that the unsatisfied selected lateral constraint has just been sequenced.

Advantageously the step of selecting a lateral constrained waypoint of the flight plan is suitable for choosing the said lateral constrained waypoint from among one of the following points;
a point of "ATC compulsory reporting point" or "essential waypoint" type such as defined in the A424 standard,
a turning point,
a point that absolutely must be overflown,
a point with which is associated at least one constraint of altitude, speed or time type that must be complied with by the said aircraft,
a point of the flight plan selected by the pilot.

Advantageously the first angle of rejoining equals 45 degrees.

Advantageously a transition between the said trajectory of the said aircraft and the lateral rejoining trajectory is carried out with a constant roll, likewise a transition between the lateral rejoining trajectory and the flight plan is carried out with a constant roll, and/or a speed used by the aircraft during the said lateral rejoining trajectory is a speed which is planned on the flight plan and projected to iso-distance on the lateral rejoining trajectory.

Advantageously the second angle of rejoining equals a first value, or the second angle depends on an altitude of the aircraft and equals a second value above a predetermined altitude and a third value below the predetermined altitude or the said second angle is equal to the angle between the route angle of the current trajectory of the aircraft and the route angle of the sequencing plan for the constrained point or the said second angle is equal to the minimum of the said angle values.

The first value is less than the second value and is greater than the third value.

Advantageously the second angle of rejoining equals 90°, or the second angle depends on an altitude of the aircraft and equals 120° above 19500 feet or 5944 meters and 70° below 19500 feet or 5944 meters or the said second angle is equal to the angle between the route angle of the current trajectory of the aircraft and the route angle of the sequencing plan for the constrained point or the said second angle is equal to the minimum of the said angle values.

The second angle thus determined can furthermore be limited by the angle formed by the sequencing plan for the end point of the active segment with the route angle of the current trajectory.

Advantageously a transition between the said trajectory of the said aircraft and the lateral rejoining trajectory is carried out with a constant roll, likewise a transition between the lateral rejoining trajectory and the flight plan is carried out with a constant roll, and/or a speed used by the aircraft during the said lateral rejoining trajectory is a speed which is planned on the flight plan and projected to iso-distance on the lateral rejoining trajectory.

Advantageously the method of the invention carries out, as soon as is valid a condition defined by the fact that:
the said aircraft is not slaved to the vertical profile
and that a vertical discrepancy between the position of the aircraft and the scheduled vertical profile of the active flight plan exceeds a second threshold,
the following repetitive sequential steps:
a step of testing for vertical divergence of the trajectory of the aircraft with respect to the active segment of the vertical profile,
a step of selecting a vertical constrained waypoint of the flight plan that the aircraft must rejoin,
the first determining step, suitable for determining a first vertical decision point allowing the rejoining of the selected vertical constrained waypoint, according to an optimal flight criterion making it possible to satisfy the constraint attached therewith, the displaying step suitable for displaying the first decision point, a step of determining passing of the first vertical decision point by the aircraft, a step of emitting an alert indicating the passing of the first vertical decision point, a step of determining the arming of a managed vertical guidance mode, making it possible to satisfy the lateral or vertical or temporal constraint of the constrained waypoint, if the managed vertical guidance mode is armed the method comprises the following step:
  a final step of engaging the previously armed managed vertical guidance mode allowing the rejoining of the constrained lateral point selected according to an optimal flight criterion, if the managed vertical guidance mode is not armed the method comprises the following steps:
  a step of sequencing the selected vertical constrained waypoint of the flight plan,
  a step of emitting an alert indicating that the unsatisfied selected vertical constraint has just been sequenced.

Advantageously the method comprises subsequent to the step of determining the arming of the managed vertical guidance mode the following steps:
  the second determining step suitable for determining a second vertical decision point allowing the rejoining of the selected vertical constrained waypoint, according to a so-called limit rejoining criterion,
  the displaying step, suitable for displaying the second decision point,
  a step of periodic calculation, updating and display of a trajectory for rejoining the selected constrained vertical point, from the aircraft,
  a step of determining the armed status of the managed vertical guidance mode,
  if the managed vertical guidance mode is armed the method comprises the following step
    a final step of rejoining the constrained vertical point selected according to a limit flight criterion
  if the managed vertical guidance mode is not armed the method comprises the following steps,
    a repetitive step of determining the passing of the second vertical decision point by the aircraft,
    the step of sequencing the selected vertical constrained waypoint of the flight plan,
    the step of emitting an alert indicating that an unsatisfied vertical constraint has just been sequenced.

Advantageously the method carries out as soon as is valid a condition defined by the fact that:
  the said aircraft is not slaved to the vertical profile
  and that a vertical discrepancy between the position of the aircraft and the scheduled vertical profile of the active flight plan exceeds a second threshold,
the following repetitive sequential steps:
  a step of testing for vertical divergence of the trajectory of the aircraft with respect to the active segment of the vertical profile,
  a step of selecting a vertical constrained waypoint of the flight plan that the aircraft must rejoin,
  the first determining step, suitable for determining a first vertical decision point allowing the rejoining of the selected vertical constrained waypoint, according to an optimal flight criterion making it possible to satisfy the constraint attached therewith, the displaying step suitable for displaying the first decision point,
  a step of determining passing of the first vertical decision point by the aircraft,
  a step of emitting an alert indicating the passing of the first vertical decision point,
  a step of determining the arming of a managed vertical guidance mode, making it possible to satisfy the lateral or vertical or temporal constraint of the constrained waypoint,
  if the managed vertical guidance mode is armed the method comprises the following step:
    a final step of engaging the previously armed managed vertical guidance mode allowing the rejoining of the constrained lateral point selected according to an optimal flight criterion,
  if the managed vertical guidance mode is not armed the method comprises the following steps:
    a step of sequencing the selected vertical constrained waypoint of the flight plan,
    a step of emitting an alert indicating that the unsatisfied selected vertical constraint has just been sequenced.

The invention also relates to a flight management system configured for the implementation of the method presented above.

Thus the method of the invention makes it possible to determine trajectory points up to which the pilot can follow the air traffic controller's instructions while being able thereafter to comply with the next constraints of the flight plan.

Moreover the method takes into account the current and predicted parameters of the aircraft for the calculation of the decision points making it possible to return to the flight plan. This return to the flight plan can be controlled in a manual manner by selection by the pilot or in an automatic manner if the pilot has previously selected a mode with automatic return to the flight plan.

BRIEF DESCRIPTION OF THE DRAWINGS

The invention will be better understood and other advantages will become apparent on reading the detailed description given by way of nonlimiting example and with the aid of the figures among which:

FIGS. 10 to 15 present various embodiments of the display system.

DETAILED DESCRIPTION

Figure 1:
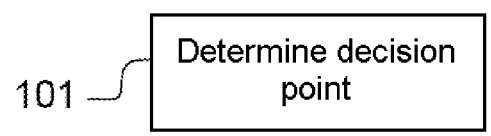
FIG. 1 presents the method for determining a decision point.

FIG. 1 presents the method for determining a decision point implemented when aircraft flies on a trajectory shifted with respect to a flight plan. The flight plan comprises a plurality of waypoints, some of which are said to be constrained.

The method comprises a step 101 of determining at least one point of the trajectory, termed decision point. This point is situated on the current trajectory of the aircraft. The current trajectory is defined by the continuation of the flight according to the aircraft's current guidance parameters. This decision point is that point, on the current trajectory, beyond which the aircraft can no longer rejoin a constrained waypoint of the reference flight plan, determined as being either the next selected constrained point, or a point chosen by the pilot, while complying with a defined criterion. This determination of the decision point is carried out by determining a point of intersection between the current trajectory of the aircraft and a rejoining trajectory between the decision point and the selected constrained waypoint. The rejoining trajectory complies with at least one predefined criterion.

The method comprises in one embodiment a preliminary step of determining the waypoint of the reference flight plan whose constraint is considered to have to be complied with. This constrained waypoint may for example be:
- as being by default a point (or waypoint) of the flight plan termed active point or "active waypoint" situated ahead of the aircraft,
- or as being a point of the flight plan having a constraint and situated ahead of the aircraft. The constraints which may be associated with this point termed constrained waypoint are for example an altitude, a speed or a time that must be complied with by the aircraft when transiting the point,
- or as being a point of the flight plan having a constraint and situated ahead of a point, defined by the pilot, on the trajectory of the aircraft,
- or as being a point of the flight plan selected by the pilot and situated ahead of the aircraft.

Figure 2:
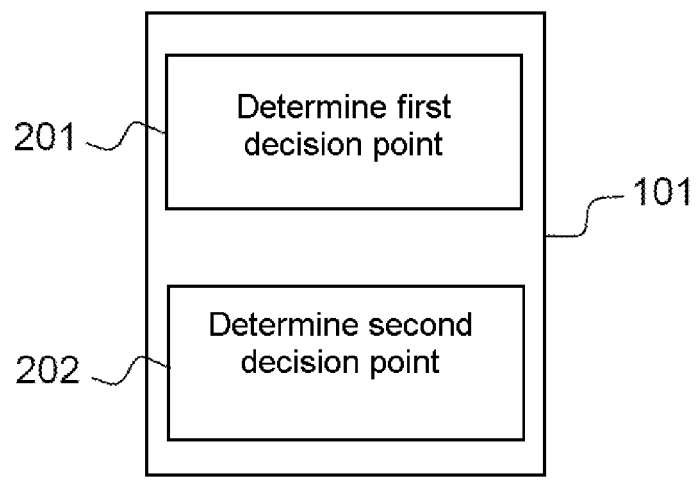
FIG. 2 presents a first embodiment of the step of determining a decision point.

In one embodiment, presented in FIG. 2, the determining step 101 comprises the following two steps:
- a first step 201 of determining at least one first decision point, by determining a trajectory point from which the aircraft must rejoin the selected constrained waypoint of the flight plan while complying with at least one first rejoining criterion or optimal criterion,
- a second step 202 of determining at least one second decision point, by determining a trajectory point, from which the aircraft must rejoin the selected constrained waypoint of the flight plan while complying with at least one second rejoining criterion or limit criterion. The limit criterion is less restrictive than the optimal criterion permitting for example less comfortable guidance parameters.

In one embodiment the optimal rejoining criterion takes account of a fixed angle of comfortable rejoining of the selected constrained waypoint of the flight plan, of the performance of the aircraft, of the ideal speed of the aircraft, while preserving substantially the same speed and the same aerodynamic configuration of the aircraft. The aerodynamic configuration comprises in particular the extended configuration of the airbrakes, of the slats, of the flaps and of the landing gear.

In another embodiment the optimal rejoining criterion takes account furthermore of a variable angle of rejoining of the waypoint of the temporally constrained flight plan, which variable angle depends on the distance necessary to satisfy the temporal constraint.

In one embodiment the limit rejoining criterion is based on guidance parameters using the limit performance usable by the aircraft without jeopardizing the safety and the minimum comfort of the flight. In this case the rejoining is performed by modifying the admissible angle of convergence with regard to the selected constrained waypoint of the flight plan, the aerodynamic configuration of the aircraft, the engine revs, an admissible maximum speed of the aircraft. Limit rejoining is performed if optimal rejoining is no longer possible.

A first criterion is considered to be less restrictive than a second criterion if when the first criterion is complied with then the second criterion is also complied with.

Stated otherwise, the method consists in determining the place at which it will be too late to automatically or manually commence a procedure to rejoin the flight plan firstly according to an optimal criterion and thereafter according to a limit criterion. This rejoining of the flight plan makes it possible to satisfy the selected constraint of the flight plan. This method is carried out while taking account of the performance of the aircraft. This method comprises two steps; in the first step the decision point is the point making it possible to rejoin the selected point of the flight plan under optimal conditions. In particular it is done by complying with the comfort of the passengers and the ideal speed of the aircraft. Moreover it is done while preserving substantially the same speed and the same aerodynamic configuration of the aircraft. The aerodynamic configuration comprises in particular the extended configuration of the airbrakes, of the slats, of the flaps and of the landing gear. Thereafter in a second step the decision point is the point making it possible to rejoin the selected point of the flight plan under limit conditions. In this case the rejoining is performed by modifying the aerodynamic configuration of the aircraft and the engine revs. Thus the speed and the slope of the aircraft can be modified. Limit rejoining is performed when optimal rejoining is no longer possible.

Figure 3:
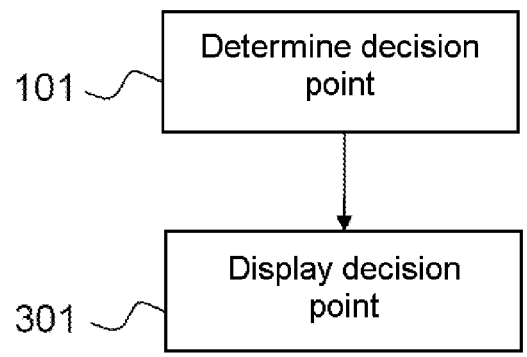
FIG. 3 presents the method for determining a decision point comprising a display step.

FIG. 3 presents an embodiment of the method furthermore comprising a step 301 of displaying at least one decision point.

In one embodiment the criterion or each of the criteria depends on at least one parameter chosen from among:
- a first parameter representative of a horizontal rejoining angle between the flight plan and the rejoining trajectory,
- a second parameter representative of an angle of roll,
- a third parameter representative of a speed of the aircraft making it possible to increase the flight slope. This speed can correspond to a theoretical speed scheduled on the flight plan and incremented substantially during descent (for example by 5 knots) for nominal rejoining, and a maximum theoretical descent speed, or minimum climb speed flyable by the aircraft, deduced from the aircraft performance or defined by the pilot, by using the chosen airbrake configuration for a limit rejoining,
- a fourth parameter representative of the thrust of the engines of the aircraft that can vary between the idling mode during descent or approach and continuous maximum thrust when climbing or cruising,
- a fifth parameter representative of an extended configuration of the airbrakes.

The flight plan can be defined by the pilot with the help of the following elements:

The list of waypoints of the flight plan. The waypoints could equally be referred to as "points of transit". Constraints (for example a transit altitude) may be associated with these waypoints, the waypoint then becomes a constrained waypoint.

The list of airways (or "aerial routes") and of departure and arrival procedures used.

With the help of this flight plan the flight management system can determine the trajectory that must be followed by the aircraft in space, also known by the expression 3D trajectory. This trajectory is calculated as a function of the following elements:

the geometry of the segments between the waypoints (also known by the expression "leg"), the performance of the aircraft, the various constraints that must be complied with by the aircraft on each point or segment of route (compulsory overflight, altitude, speed, time, slope), and the engine thrust and speed settings that must be complied with by the aircraft to follow the active flight plan (these last two elements are in particular used for the calculation of the aircraft's turning radius).

In one embodiment, when the aircraft flies on a trajectory shifted laterally with respect to the flight plan, the flight management system can implement the method of the invention and thus determine and display decision points indicating the optimal point and limit point where the pilot can automatically or manually commence a procedure to rejoin the flight plan at the selected point so as to satisfy the constraint of the flight plan at this point.

Figure 4A:
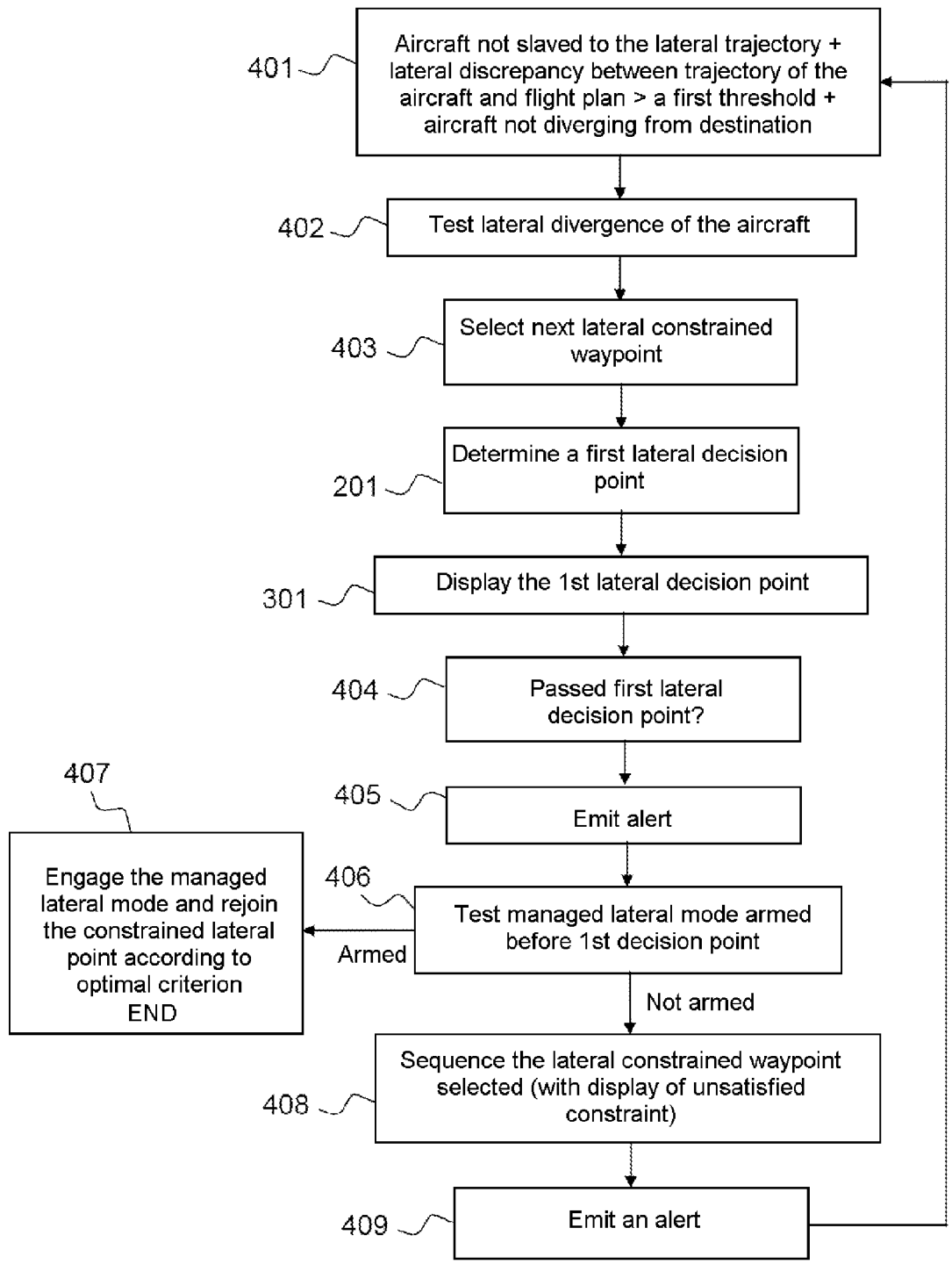
FIGS. 4.a and 4.b present two embodiments of the step of determining two decision points.
Figure 4B:
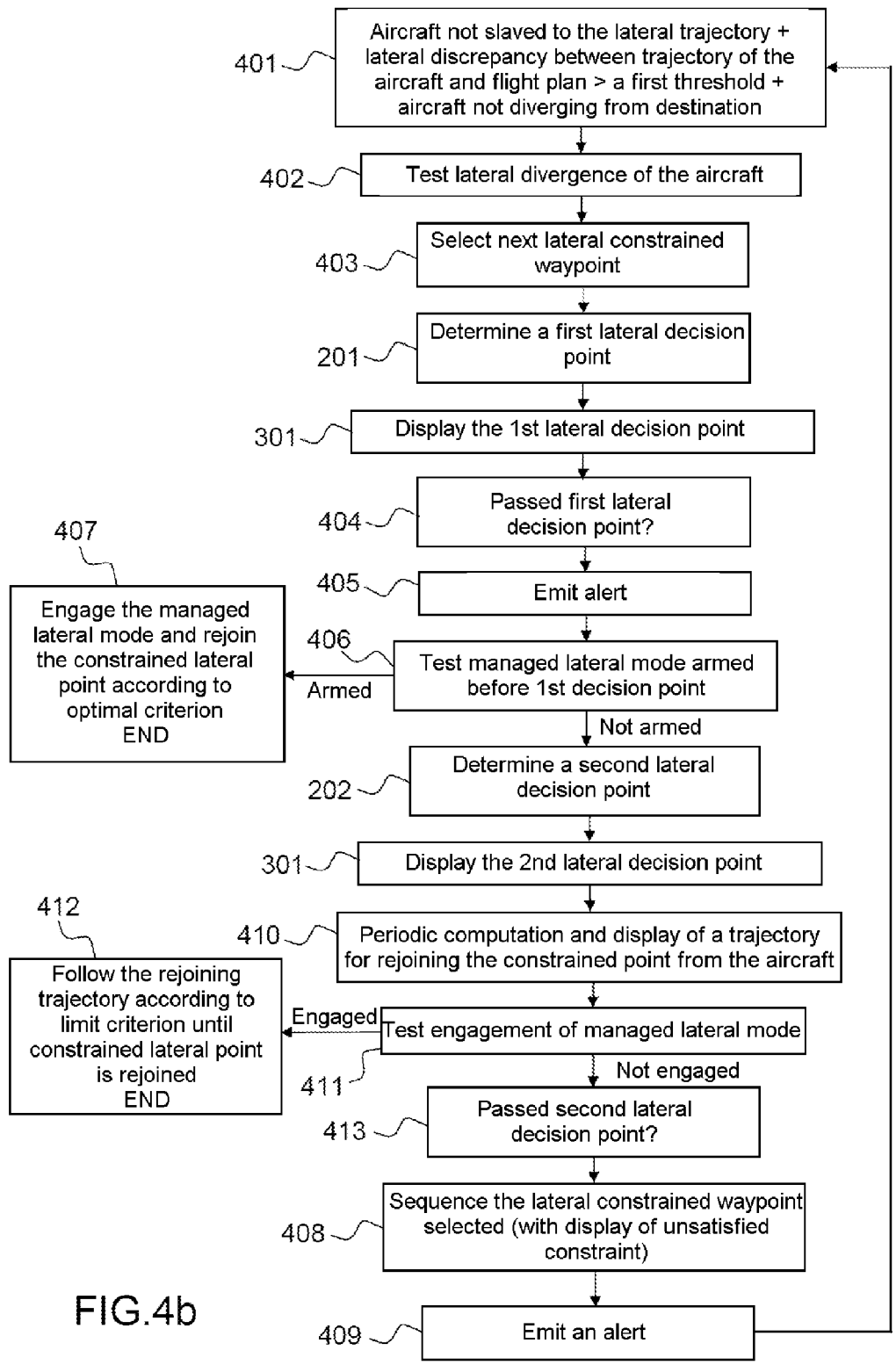

In one embodiment, presented in FIG. 4.a, the method is implemented as soon as the aircraft is in flight with a defined flight plan and as soon as is valid the condition 401 defined by the fact:

that the aircraft is not slaved to the lateral trajectory, that the aircraft does not diverge with respect to the destination, when for example the distance to the destination increases, that a lateral discrepancy between a position of the aircraft and an active flight plan exceeds a first threshold. This threshold is adjustable but can be set by default to the value of RNP ("Required Navigation Performance") between 0.1 and 4 to 10 Nm according to the type of space followed.

The iterative method thereafter comprises the sequence of following steps, each step being triggered as soon as the previous step is satisfied:

a step 402 of determining lateral divergence of the trajectory of the aircraft with respect to the active segment of the flight plan a step 403 of selecting a lateral constrained waypoint of the flight plan towards which an aircraft must rejoin the flight plan, the first determining step 201, suitable for determining a first lateral decision point making it possible for the first parameter (a rejoining angle between the flight plan and the lateral rejoining trajectory) to equal a first rejoining angle, termed optimal angle for rejoining the selected lateral constrained waypoint of the flight plan while satisfying the constraint attached therewith, the displaying step 301 suitable for displaying the first decision point, a step 404 of determining the passing of the first lateral decision point by the aircraft, a step 405 of emitting an alert indicating the passing of the first lateral decision point, a step 406 of determining whether the managed lateral guidance mode, making it possible to satisfy the lateral or vertical or temporal constraint of the constrained waypoint, is armed before transiting the first optimal decision point, if the managed lateral guidance mode is armed the method comprises the following step:

a final step 407 of engaging the previously armed managed lateral guidance mode allowing the rejoining of the constrained lateral point selected according to an optimal flight criterion, if the managed lateral guidance mode is not armed the method comprises the following steps:

a step 408 of sequencing the selected lateral constrained waypoint of the flight plan, a step 409 of emitting an alert indicating that a lateral constraint is unsatisfied.

In one embodiment, presented in FIG. 4.b, the method comprises, subsequent to step 406 of determining the arming of the managed lateral guidance mode, the following steps:

the second determining step 202 suitable for determining a second lateral decision point making it possible for the first parameter (a rejoining angle between the flight plan and the lateral rejoining trajectory) to equal a second rejoining angle, termed limit angle for rejoining the selected lateral constrained waypoint of the flight plan, the displaying step 301, suitable for displaying the second decision point, a step 410 of periodic calculation, updating and display of a trajectory for rejoining the selected constrained lateral point, from the aircraft, a step 411 of determining the engaged status of the managed lateral guidance mode, if the managed lateral guidance mode is engaged the method comprises the following step a final step 412 of rejoining the constrained lateral point selected according to a limit flight criterion if the managed lateral guidance mode is not engaged the method comprises the following steps a repetitive step 413 of determining the passing of the second lateral decision point by the aircraft, step 408 of sequencing the selected lateral constrained waypoint of the flight plan, the step 409 of emitting an alert indicating that the unsatisfied selected lateral constraint has just been sequenced.

An aircraft diverges laterally with respect to the active segment if the current trajectory of the aircraft makes an angle greater than 90° with respect to the active lateral segment and if its distance to the next lateral constrained waypoint or the destination increases.

When the aircraft is slaved to the trajectory of the active flight plan, a next lateral constrained waypoint is sequenced laterally when the aircraft passes through a vertical plane perpendicular to the active lateral segment when this point must be overflown, or passing through the angle corresponding to the bisector between the active segment and the following segment when the turn towards the following segment can be anticipated.

When the aircraft is not slaved to the trajectory of the active flight plan but is at a distance less than a certain threshold or when it is convergent on the active segment, or is divergent with respect to the active lateral segment and the lateral guidance mode is previously armed, a next lateral constrained waypoint is sequenced laterally when the aircraft passes through a vertical plane perpendicular to the active lateral segment when this point must be overflown, or passing through the angle corresponding to the bisector between the active segment and the following segment when the turn towards the following segment can be anticipated.

When the aircraft is not slaved to the trajectory of the active flight plan and is at a distance greater than a certain threshold or when it is divergent with respect to the active segment, or the lateral guidance mode is not previously armed, a next lateral constrained waypoint is sequenced laterally when the second lateral decision point has been passed.

In one embodiment the second rejoining angle is greater than the first rejoining angle. Moreover the second rejoining angle is no longer constrained by the criterion of the optimal solution and therefore can take another value but which must not exceed a limit angle. This limit angle may for example be 90° of the angle of the flight plan segment according to the active segment, or correspond to the angle determined by the bisector between the active and following segments.

In one embodiment step 403 of selecting a lateral constrained waypoint of the flight plan is suitable for selecting the lateral constrained waypoint from among one of the following points;
  a point of "ATC compulsory reporting point" or "essential waypoint" type. These types of bridges are defined in the A424 standard,
  a turning point, this is to say a point marking a lateral inflection of the flight plan or,
  a point that absolutely must be overflown,
  a point with which is associated one or more constraints such as altitude, speed or time,
  a point of the flight plan selected by the pilot.

These various points are also known as "waypoints".

Figure 5:
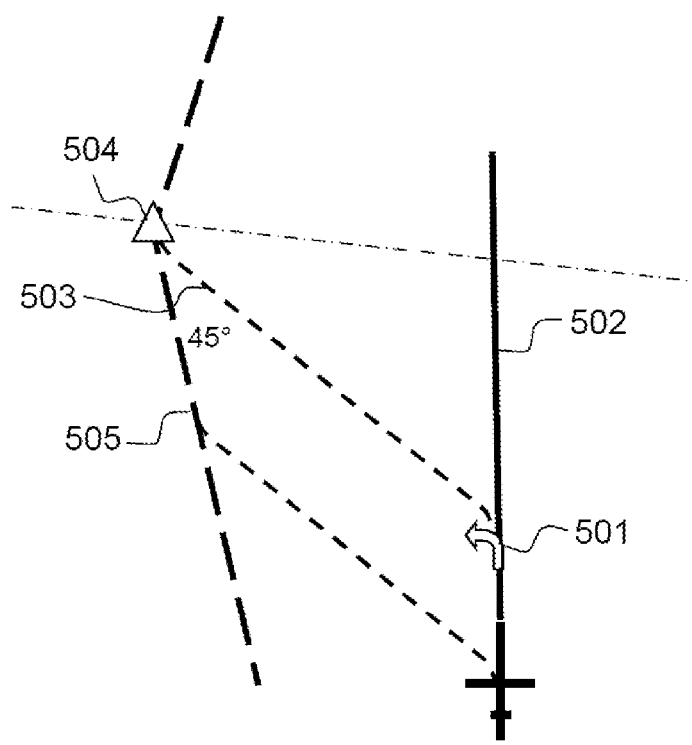
FIG. 5 presents an embodiment for determining a first lateral decision point.

Thus in an embodiment presented in FIG. 5, the first lateral decision point 501 is calculated as being the point of intersection between the trajectory of the aircraft 502 and a rejoining trajectory 503 bound for the selected lateral constrained waypoint 504. The rejoining trajectory has an angle of 45° with the active segment of the flight plan 505.

Moreover the transition between the trajectory of the aircraft and the rejoining trajectory is carried out with a constant roll associated with an optimal criterion; likewise the transition between the rejoining trajectory and the flight plan is carried out with this same constant roll.

Finally, if the automatic speed or "speed auto" mode is used, the aircraft speed control takes the value of the speed planned on the flight plan, projected perpendicularly or at iso-distance on the rejoining trajectory 503.

Figure 6:
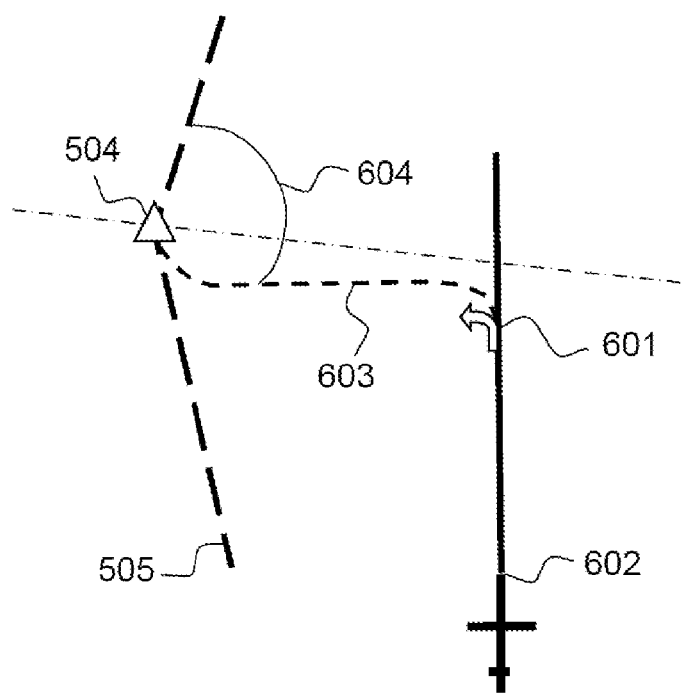
FIG. 6 presents an embodiment for determining a second lateral decision point.

Moreover in an embodiment presented in FIG. 6, the second lateral decision point 601 is at the intersection of the trajectory 602 of the aircraft and of the rejoining trajectory 603 bound for the selected lateral constrained waypoint 504. The trajectory 602 of the aircraft is the trajectory followed by the aircraft using the controller's instructions in particular in terms of heading and speed. The rejoining trajectory 603 has an angle 604 with the segment according to the active segment of the flight plan 505. This angle 604 is the minimum between:
  the angle formed by the sequencing plan for the end point of the active segment with the route angle of the current trajectory
  and the limit angle of capture towards the following segment which may for example be 90° by default or, in a manner more suited to the standard in force DO236B, 120° above the 195 flight level and 70° under the 195 flight level.

The 195 flight level represents an altitude of 19500 feet or 5944 meters.

Moreover the transition between the trajectory 602 of the aircraft and the rejoining trajectory 603 is carried out with a constant roll associated with a limit criterion; likewise the transition between the rejoining trajectory 603 and the flight plan is carried out with this same constant roll.

Finally, if the automatic speed or "speed auto" mode is engaged, the aircraft speed control takes the value of the speed which is planned on the flight plan and projected to iso-distance on the rejoining trajectory 603.

Thus in the embodiment presented in FIGS. 5 and 6, the direct rejoining trajectory 506 before transiting the first decision point 501 is calculated and displayed continuously with the help of the aircraft position until it intercepts the active segment of the flight plan according to an optimal angle of 45° taking account of the transitions at constant roll according to the optimal criterion, until the aircraft reaches the first decision point 501.

In another embodiment, the rejoining trajectory 506 is calculated and displayed continuously starting from a point on the current trajectory of the aircraft situated at a distance or a flight time defined by the pilot upstream of the position of the aircraft.

After transiting the first decision point 501, the direct rejoining trajectory 605 is calculated and displayed continuously with the help of the aircraft position until the next constrained waypoint which is the termination of the active segment of the flight plan taking account of the transitions at constant roll according to the limit criterion, until the aircraft reaches the second decision point 601 beyond which the next constrained waypoint is sequenced by adopting as active segment the following segment terminating on the next following constrained waypoint, on which segment a new rejoining trajectory will be calculated and refreshed continuously.

In another embodiment presented in FIG. 6 *bis*, the transiting by the aircraft of the first decision point 501 determines the sequencing of the constrained waypoint and the direct rejoining trajectory 606 is calculated and displayed continuously with the help of the aircraft position until it intercepts the flight plan according to an optimal angle of 45° with respect to each lateral segment of the flight plan, taking account of the transitions at constant roll according to the optimal criterion.

Finally, when the pilot decides to rejoin the reference flight plan, he can do so in two ways:
  engagement of an automatic guidance mode slaved to the trajectory of the active flight plan following the direct rejoining trajectory 506 before transiting the first decision point or the direct trajectory 603 between the first and the second decision point
  arming of an automatic guidance mode which will be engaged automatically when transiting the first decision point and which will be slaved to the trajectory of the active flight plan following the rejoining trajectory arising from the first decision point 501.

Figure 7A:
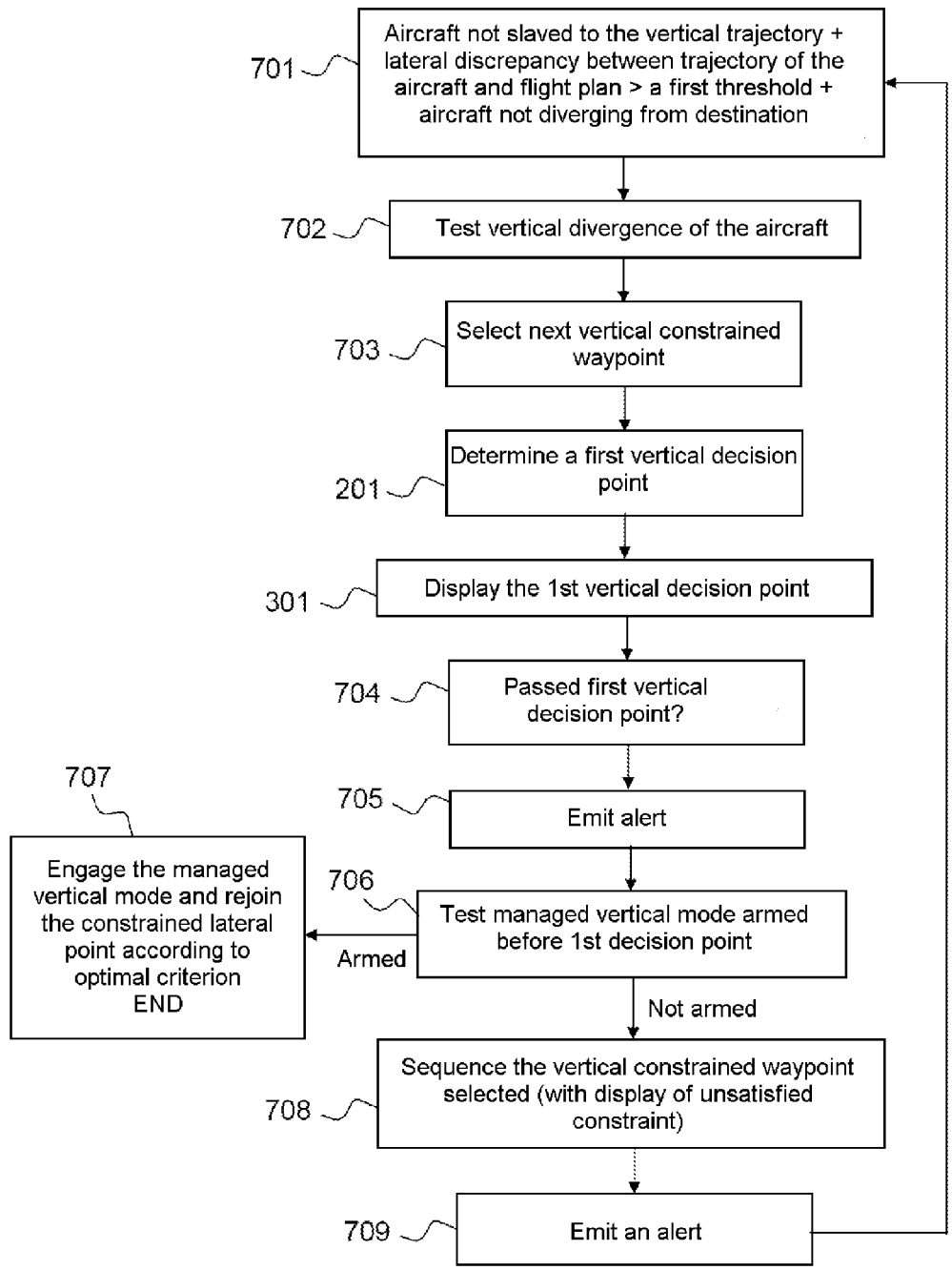
FIGS. 7.a and 7.b present two other embodiments of the step of determining two decision points.
Figure 7B:
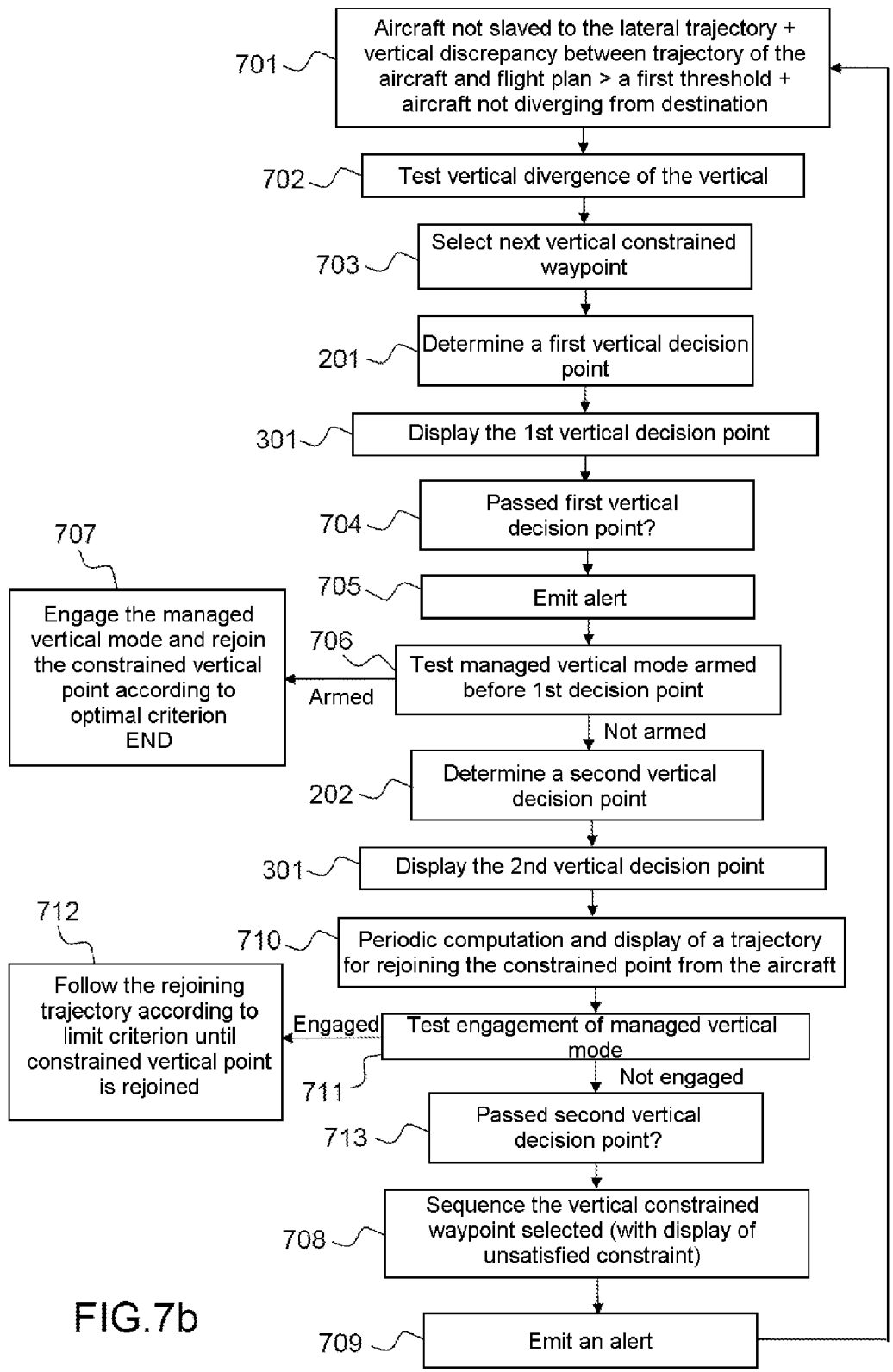

In another embodiment presented in FIG. 7.*a* the method is implemented as soon as is valid the condition 701 defined by the fact that:
  the aircraft is not slaved to the vertical profile
  and a vertical discrepancy between the position of the aircraft and the scheduled vertical profile of the active flight plan exceeds a second threshold.

This second threshold corresponds for example to the standards defined in the standard RTCA DO236B varying between 50 and 500 feet or 15.240 to 152.40 meters according to the aircraft flight context.

The iterative method comprises the sequence of the following steps, each step being triggered as soon as the previous step is satisfied:
- a step 702 of testing for vertical divergence of the trajectory of the aircraft with respect to the active segment of the vertical profile,
- a step 703 of selecting a vertical constrained waypoint of the flight plan that the aircraft must rejoin,
- the first determining step 201, suitable for determining a first vertical decision point allowing the rejoining of the selected vertical constrained waypoint, according to an optimal flight criterion making it possible to satisfy the constraint attached therewith,
- a step 301 of displaying the first decision point,
- a step 704 of determining passing of the first vertical decision point by the aircraft,
- a step 705 of emitting an alert indicating the passing of the first vertical decision point,
- a step 706 of determining the arming of a managed vertical guidance mode, making it possible to satisfy the lateral or vertical or temporal constraint of the constrained waypoint,
- if the managed vertical guidance mode is armed the method comprises the following step:
  - a final step 707 of engaging the previously armed managed vertical guidance mode allowing the rejoining of the constrained lateral point selected according to an optimal flight criterion,
- if the managed vertical guidance mode is not armed the method comprises the following steps:
  - a step 708 of sequencing the selected vertical constrained waypoint of the flight plan,
  - a step 709 of emitting an alert indicating that the unsatisfied selected vertical constraint has just been sequenced.

In one embodiment, presented in FIG. 7.b, the method comprises, subsequent to step 706 of determining the arming of the managed vertical guidance mode, the following steps:
- the second determining step 202 suitable for determining a second vertical decision point allowing the rejoining of the selected vertical constrained waypoint, according to a so-called limit rejoining criterion,
- the displaying step 301, suitable for displaying the second decision point,
- a step 710 of periodic calculation, updating and display of a trajectory for rejoining the selected constrained vertical point, from the aircraft,
- a step 711 of determining the armed status of the managed vertical guidance mode,
- if the managed vertical guidance mode is armed the method comprises the following step
  - a final step 712 of rejoining the constrained vertical point selected according to a limit flight criterion
- if the managed vertical guidance mode is not armed the method comprises the following steps
  - a repetitive step 713 of determining the passing of the second vertical decision point by the aircraft
  - step 708 of sequencing the selected vertical constrained waypoint of the flight plan,
  - the step 709 of emitting an alert indicating that an unsatisfied vertical constraint has just been sequenced.

In one embodiment the first decision point is determined as the intersection of the current trajectory with the trajectory making it possible to rejoin the waypoint constrained according to an optimum criterion defined in the climb flight phase by full-thrust engine revs and the maintaining of the speed planned on the flight plan, and in the descent flight phase by idling or slightly higher than idling engine revs, the airbrakes half extended and an aircraft speed corresponding to the planned speed supplemented with a default margin of 5 knots.

In one embodiment the limit criterion is defined in the climb flight phase by engine revs with continuous maximum thrust, a smoothed retracted airbrakes configuration and a minimum speed, and in the descent flight phase by absolute idling engine revs, a certified maximum speed permitted by the performance of the aircraft or a limit speed given by the pilot or his operator and airbrakes in the fully extended position.

An aircraft diverges vertically with respect to the active vertical segment if the angle of the current trajectory of the aircraft is less than the angle of the said active vertical segment in the climb flight phase, or greater than the said active vertical segment in the descent flight phase, considering the angle to be negative in descent.

A vertical constrained waypoint is sequenced vertically when the aircraft passes under the altitude of this point when descending, or above the altitude of this point when climbing.

The selected vertical constrained waypoint is a point for which the aircraft must comply at this point with an altitude which can come from an existing procedure or can be selected by the pilot.

In one embodiment the steps of the method of FIG. 4.a or FIG. 4.b are carried out initially. Thereafter, subsequently if it is determined that the aircraft does not diverge excessively from the lateral trajectory of the active flight plan, the steps of the method of FIG. 7.a or of FIG. 7.b are implemented.

Thus in this embodiment the method presented in FIG. 7.a or of FIG. 7.b is implemented if it is determined that the aircraft does not diverge excessively from the lateral trajectory of the active flight plan. Indeed when the aircraft diverges in an excessive manner laterally with respect to the flight plan, the distance to the destination increases and the first and the second lateral decision point can no longer be determined. There is no longer any sense in calculating the first or the second vertical decision point since the distance to the destination increasing with the divergence, compliance with the next constraint is no longer reliable.

Figure 8:
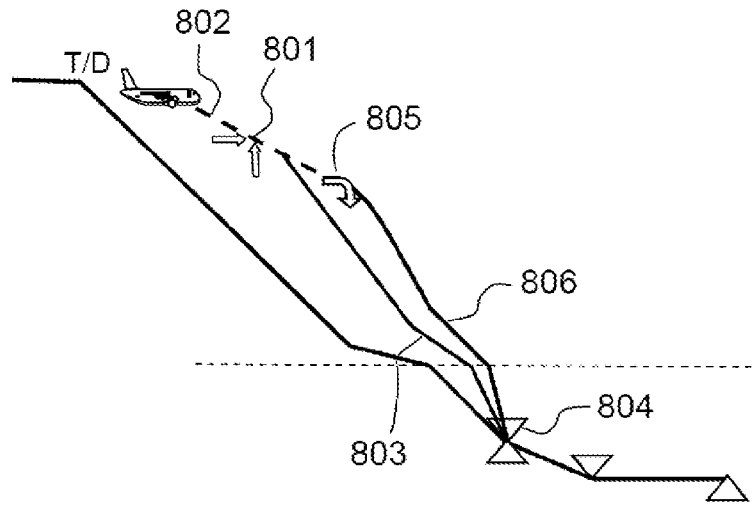
FIG. 8 presents an embodiment of the determination of a first and second vertical decision point.

FIG. 8 presents an embodiment of the determination of the first and of the second vertical decision point.

The first vertical decision point 801 is calculated as being situated at the intersection between the aircraft trajectory 802 propagated while maintaining the current guidance parameters and a first optimal rejoining trajectory 803 bound for the selected vertical constrained waypoint 804. The aircraft trajectory 802 is the trajectory followed by complying with the air traffic controller's instructions in particular in terms of heading, vertical speed and lateral speed.

The selected vertical constrained waypoint 804 is the point whose vertical constraint is identified as being the next one that must be complied with by the aircraft.

The first optimal rejoining trajectory 803 bound for the selected vertical constrained waypoint is determined by considering that the average descent speed is slightly faster than the theoretical speed (theoretical speed plus or minus 5 knots) thereby making it possible to converge more rapidly to the constraint while complying with any downstream speed constraint with a speed tolerance (plus or minus 5 knots). Moreover the airbrakes are considered to be half extended.

The second vertical decision point 805 is calculated as being situated at the intersection between the aircraft trajectory 802 propagated while maintaining the current guidance parameters and a second limit rejoining trajectory 806 bound for the selected vertical constrained waypoint 804.

The aircraft trajectory 802 is the trajectory followed by complying with the air traffic controller's instructions in particular in terms of heading, vertical speed and lateral speed.

The selected vertical constrained waypoint 804 is the point whose vertical constraint is identified as being the next one that must be complied with by the aircraft.

The second limit rejoining trajectory 806 bound for the selected vertical constrained waypoint is determined by considering an average descent performance including a maximum descent speed that may be the minimum of the certified maxi speed of the aircraft (also known by the expression MMO/VMO) and of the constrained speed applicable on the flight plan flown.

Moreover the airbrakes are considered to be fully extended.

Finally, when the pilot decides to rejoin the reference vertical profile, he can do so in two ways:
  engagement of an automatic vertical guidance mode slaved to the vertical profile of the active flight plan according to a direct rejoining trajectory rejoining this vertical profile according to the prior art schemes.
  arming of an automatic vertical guidance mode which will be engaged automatically when transiting the first decision point 801 and which will be slaved to the rejoining trajectory 806 making it possible to rejoin the selected vertical constrained waypoint 804.

Figure 9:
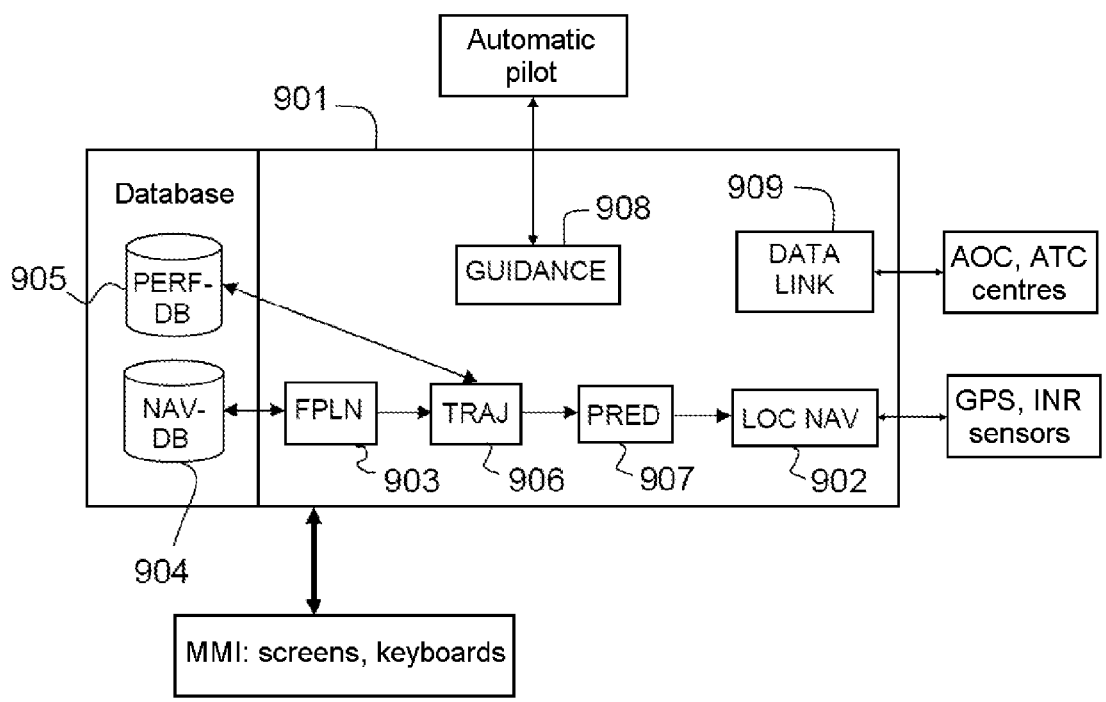
FIG. 9 presents an example of the functional modules of a flight management system.

FIG. 9 presents an example of the functional modules of a flight management system 901 in a preferential implementation of the invention, without being limiting and allowing the person skilled in the art to implement variants. The flight management system 901 is suitable for the implementation of the method of the invention. In this embodiment the system proposes the functions described in ARINC standard 702. These functions are in particular the following:
  Navigation LOCNAV, 902, this function makes it possible to perform the optimal location of the aircraft as a function of the geo-location means (GPS, GALILEO, VHF radio beacons, inertial platforms);
  Flight plan FPLN, 903, this function is used to input the geographical elements constituting the skeleton of the route to be followed (departure and arrival procedures, waypoints, airways);
  Navigation database NAVDB 904, this database is used to construct geographical routes and procedures with the help of data included in the bases (points, beacons, interception or altitude legs etc.);
  Performance database, PERF DB 905, this database contains the craft's aerodynamic and engine parameters with in particular elements making it possible to integrate the aircraft trajectory by taking into account the influence of the transitions, and/or elements allowing estimation of the durations of the transitions;
  Lateral trajectory TRAJ, 906, this function is used to construct a continuous trajectory with the help of the points of the flight plan, complying with the aircraft performances and the confinement constraints (RNP), this element allows in particular the implementation of the method described in this invention for the lateral rejoining procedure;
  Predictions PRED, 907, this function is used to construct an optimized vertical profile on the lateral trajectory, this element allows in particular the implementation of the method described in this invention for the vertical rejoining procedure;
  Guidance, GUID 908, this function is used to guide the aircraft in the lateral and vertical planes on its 3D trajectory, while optimizing the speed;
  Digital data link DATALINK 909, this function is used to communicate with the control centres and other aircraft.

The present invention may be implemented with the help of hardware and/or software elements. It may be available in the guise of computer program product on a computer readable medium. The medium may be electronic, magnetic, optical, electromagnetic or be a diffusion medium of infrared type. Such media are for example, semi-conductor memories (Random Access Memory RAM, Read-Only Memory ROM), tapes, magnetic or optical diskettes or discs (Compact Disc-Read Only Memory (CD-ROM), Compact Disc-Read/Write (CD-R/W) and DVD).

In one embodiment presented in FIG. 10 and FIG. 10 *bis* the two vertical pseudo-waypoints corresponding to the optimal decision point (FIG. 10) and limit point (FIG. 10 *bis*) of vertical reengagement making it possible to satisfy the next vertical constraint are displayed on the horizontal navigation display device.

Figure 11:
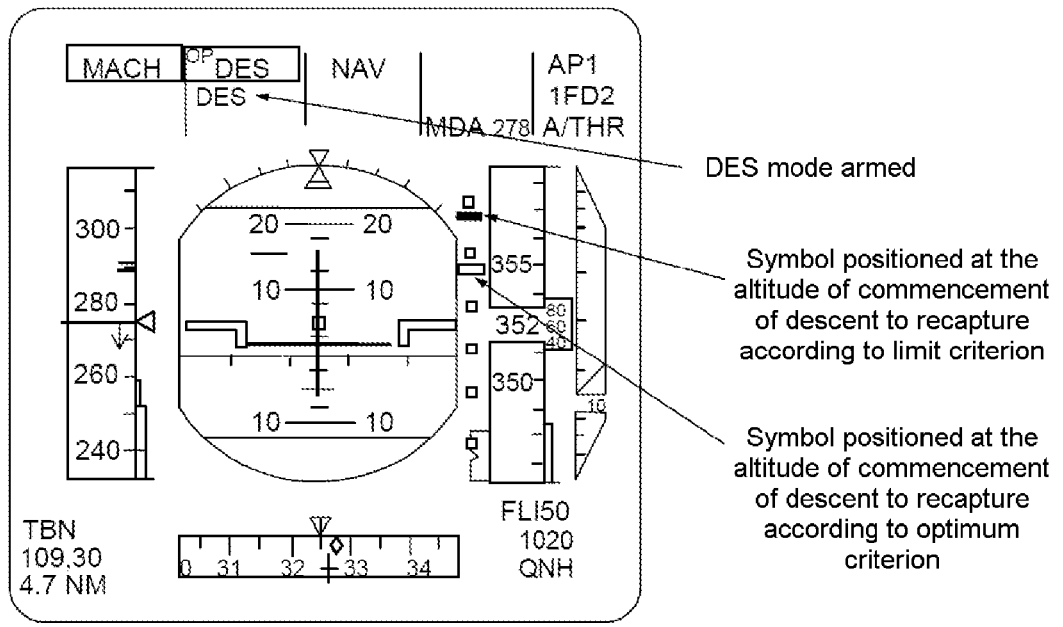

In one embodiment presented in FIG. 11 the position expressed in terms of vertical angular deviation between the angle of the vertical segment to be adopted at the moment of the first decision point and the angle between the aircraft and the first constrained vertical is displayed on the primary flight display device also known by the acronym PFD for Primary Flight Display.

Figure 12:
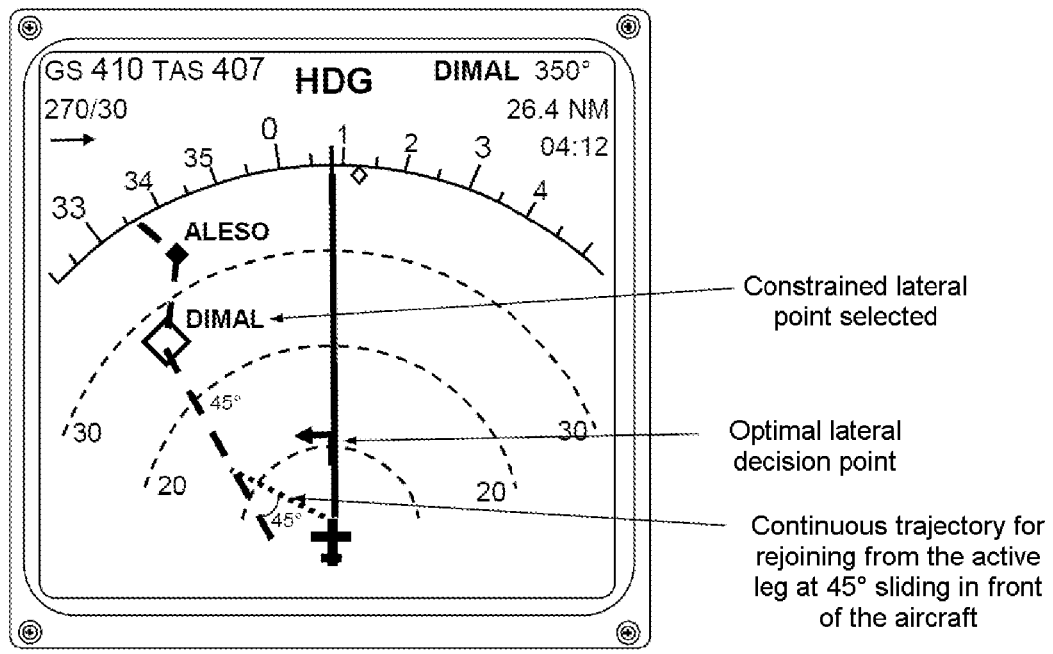

In one embodiment presented in FIG. 12 and FIG. 12 *bis* the two lateral pseudo-waypoints corresponding to the optimal decision point (FIG. 12) and limit point (FIG. 12 *bis*) of lateral reengagement making it possible to rejoin the constrained waypoint are displayed on the horizontal navigation display device. The white dashed line corresponds to the trajectory sliding along the aircraft vector intercepting the active lateral segment at an angle of 45° (FIG. 12) and intercepting the end of the active lateral segment (FIG. 12 *bis*).

Figure 13:
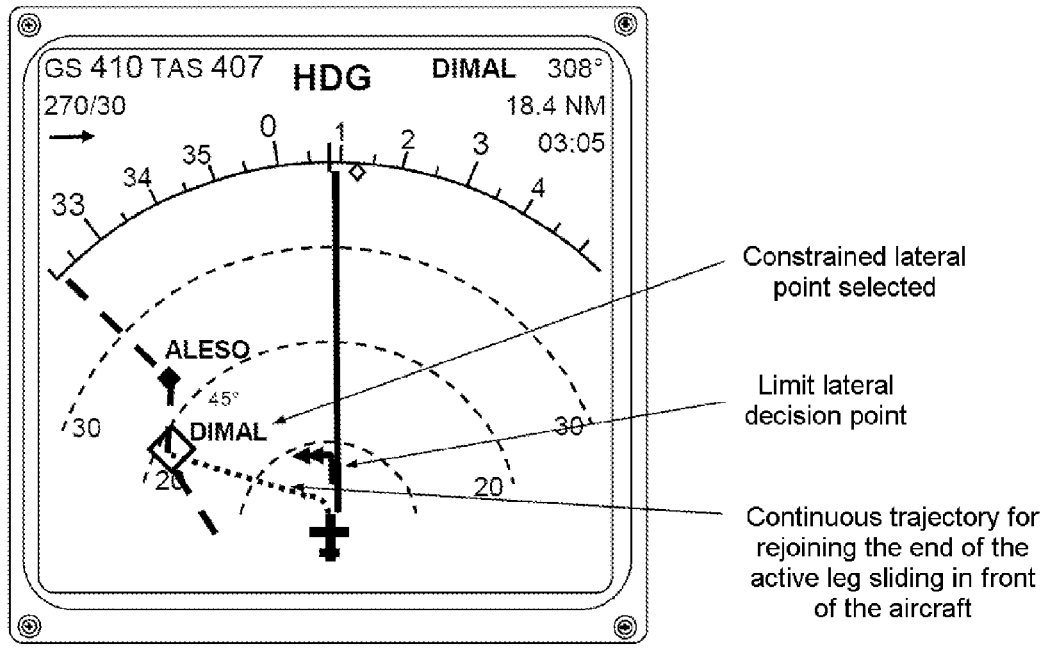
Figure 13:
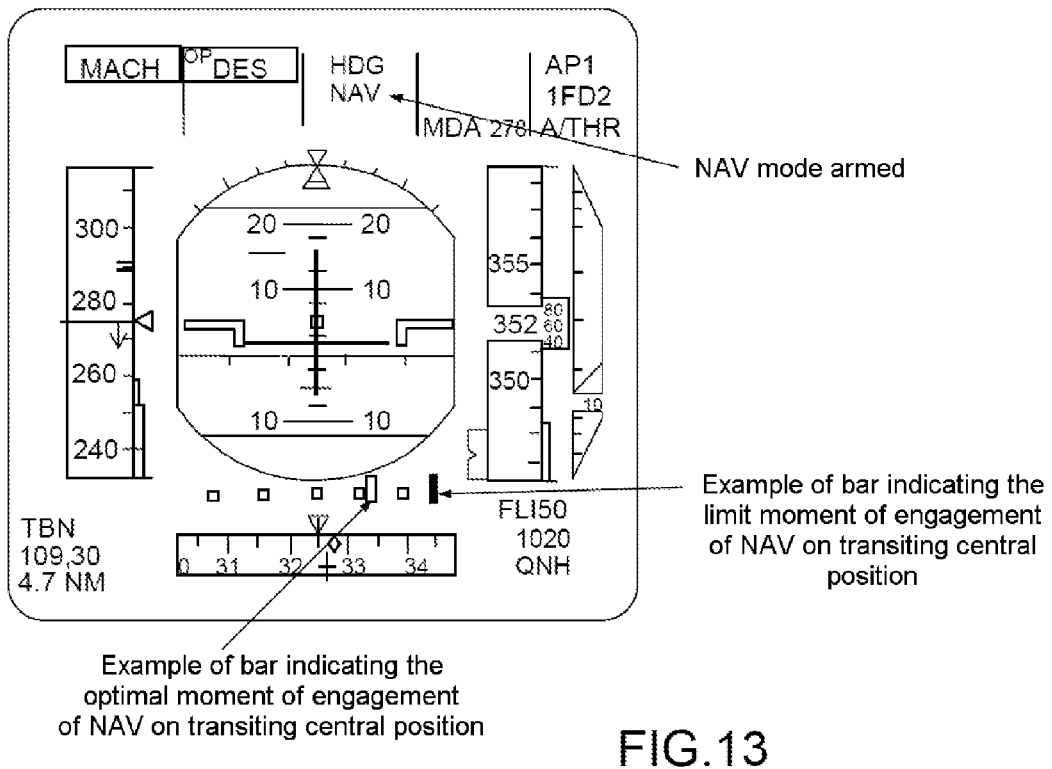

In one embodiment presented in FIG. 13 the display comprises the same information as in FIG. 11 and also comprises a representation of the horizontal angular deviations.

In one embodiment presented in FIG. 14 and FIG. 14 *bis* the display on the navigation display device comprises the aggregate of the display of the optimal (FIG. 14) and limit (FIG. 14 *bis*) lateral and vertical pseudo decision points.

Figure 15:
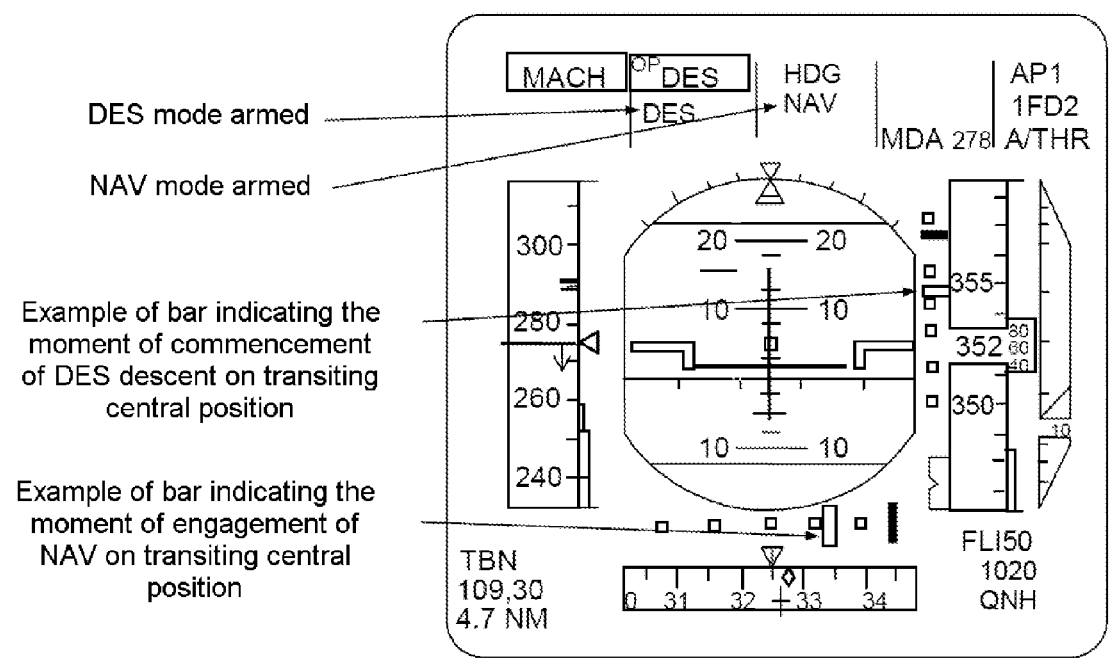

In one embodiment presented in FIG. 15 the display on the primary flight display device comprises the aggregate of the display of the lateral and vertical pseudo waypoints.

The invention claimed is:
1. A method of flight management of an aircraft flying on a trajectory shifted with respect to a flight plan comprising a plurality of constrained waypoints, the said method comprising:
  a step of determining at least one point of the said trajectory with a flight management system, termed decision point, beyond which the aircraft can no longer rejoin a selected constrained waypoint of the said flight plan by determining a point of intersection between the said trajectory and a rejoining trajectory steering towards the said selected constrained waypoint, the said rejoining trajectory complying with at least one predefined criterion;

a preliminary step of selecting the constrained waypoint with the flight management system:
as being a point of the flight plan termed active point situated ahead of the aircraft,
or as being a point of the flight plan having a constraint and situated ahead of the aircraft,
or as being a point of the flight plan having a constraint and situated ahead of a point, defined by the pilot, on the trajectory of the aircraft,
or as being a point of the flight plan selected by the pilot and situated ahead of the aircraft; and
a step of displaying at least one decision point on a display.

2. The method according to claim 1, in which the said determining step comprises:
a first step of determining at least one first point of the said trajectory, termed first decision point, from which the aircraft must rejoin the said flight plan while complying with at least one first criterion termed optimal criterion and
a second step of determining at least one second point of the said trajectory, termed second decision point, from which the aircraft must rejoin the said flight plan while complying with at least one second criterion termed limit criterion, the said limit criterion being less restrictive than the said optimal criterion.

3. The method according to claim 2 carrying out, as long as is valid the condition defined by the fact:
that the aircraft is not slaved to the lateral trajectory and
that the said aircraft does not diverge with respect to the destination and
that a lateral discrepancy between a position of the aircraft and an active flight plan exceeds a first threshold,
the following repetitive sequential steps:
a step of determining lateral divergence of the trajectory of the aircraft with respect to the active segment of the flight plan,
a step of selecting a lateral constrained waypoint of the flight plan towards which an aircraft must rejoin the flight plan,
the first determining step, suitable for determining a first lateral decision point making it possible for the first parameter to equal a first rejoining angle, termed optimal angle for rejoining the selected lateral constrained waypoint of the flight plan while satisfying the constraint attached therewith,
the displaying step suitable for displaying the first decision point,
a step of determining the passing of the first lateral decision point by the aircraft,
a step of emitting an alert indicating the passing of the first lateral decision point,
a step of determining whether the managed lateral guidance mode, making it possible to satisfy the lateral or vertical or temporal constraint of the constrained waypoint, is armed before transiting the first optimal decision point, and
if the managed lateral guidance mode is armed, a final step of engaging the previously armed managed lateral guidance mode allowing the rejoining of the constrained lateral point selected according to an optimal flight criterion, if the managed lateral guidance mode is not armed,
a step of sequencing the selected lateral constrained waypoint of the flight plan, and
a step of emitting an alert indicating that a lateral constraint is unsatisfied.

4. The method according to claim 3, comprising subsequent to step of determining the arming of the managed lateral guidance mode, the following steps:
the second determining step suitable for determining a second lateral decision point making it possible for the first parameter to equal a second rejoining angle, termed limit angle for rejoining the selected lateral constrained waypoint of the flight plan,
the displaying step, suitable for displaying the second decision point,
a step of periodic calculation, updating and display of a trajectory for rejoining the selected constrained lateral point, from the aircraft
a step of determining the engaged status of the managed lateral guidance mode,
if the managed lateral guidance mode is engaged the method comprises the following step
a final step of rejoining the constrained lateral point selected according to a limit flight criterion
if the managed lateral guidance mode is not engaged the method comprises the following steps
a repetitive step of determining the passing of the second lateral decision point by the aircraft
the step of sequencing the selected lateral constrained waypoint of the flight plan and
the step of emitting an alert indicating that the unsatisfied selected lateral constraint has just been sequenced.

5. The method according to claim 3, in which:
the said step of selecting a lateral constrained waypoint of the flight plan is suitable for choosing the said lateral constrained waypoint from among one of the following points;
a point of "ATC (Air Traffic Control) compulsory reporting point" or "essential waypoint" type such as defined in an A424 standard,
a turning point,
a point that absolutely must be overflown,
a point with which is associated at least one constraint of altitude, speed or time type that must be complied with by the said aircraft,
a point of the flight plan selected by the pilot.

6. The method according to claim 3, in which:
the said first angle of rejoining equals 45 degrees.

7. The method according to claim 6, in which:
a transition between the said trajectory of the said aircraft and the lateral rejoining trajectory is carried out with a constant roll, likewise a transition between the lateral rejoining trajectory and the flight plan is carried out with a constant roll and/or,
a speed used by the aircraft during the said lateral rejoining trajectory is a speed which is planned on the flight plan and projected to iso-distance on the lateral rejoining trajectory.

8. The method according to claim 3, in which:
the said second angle of rejoining equals 90°, or
the said second angle depends on an altitude of the aircraft and equals 120° above 5944 meters and 70° below 5944 meters or the said second angle is equal to the angle between the route angle of the current trajectory of the aircraft and the route angle of the sequencing plan for the constrained point or, the said second angle is equal to the minimum of the said angle values.

9. The method according to claim 8, in which:

a transition between the said trajectory of the said aircraft and the lateral rejoining trajectory is carried out with a constant roll, likewise a transition between the lateral rejoining trajectory and the flight plan is carried out with a constant roll and, a speed used by the aircraft during the said lateral rejoining trajectory is a speed which is planned on the flight plan and projected to iso-distance on the lateral rejoining trajectory.

10. The method according to claim 3 carrying out, as soon as is valid a condition defined by the fact that:

the said aircraft is not slaved to the vertical profile and that a vertical discrepancy between the position of the aircraft and the scheduled vertical profile of the active flight plan exceeds a second threshold, the following repetitive sequential steps:

a step of testing for vertical divergence of the trajectory of the aircraft with respect to the active segment of the vertical profile, a step of selecting a vertical constrained waypoint of the flight plan that the aircraft must rejoin, the first determining step, suitable for determining a first vertical decision point allowing the rejoining of the selected vertical constrained waypoint, according to an optimal flight criterion making it possible to satisfy the constraint attached therewith, the displaying step suitable for displaying the first decision point, a step of determining passing of the first vertical decision point by the aircraft, a step of emitting an alert indicating the passing of the first vertical decision point, a step of determining the arming of a managed vertical guidance mode, making it possible to satisfy the lateral or vertical or temporal constraint of the constrained waypoint, if the managed vertical guidance mode is armed the method comprises the following step:

a final step of engaging the previously armed managed vertical guidance mode allowing the rejoining of the constrained lateral point selected according to an optimal flight criterion, if the managed vertical guidance mode is not armed the method comprises the following steps:

a step of sequencing the selected vertical constrained waypoint of the flight plan, a step of emitting an alert indicating that the unsatisfied selected vertical constraint has just been sequenced.

11. The method according to claim 10, comprising subsequent to step of determining the arming of the managed vertical guidance mode the following steps:

the second determining step suitable for determining a second vertical decision point allowing the rejoining of the selected vertical constrained waypoint, according to a so-called limit rejoining criterion, the displaying step, suitable for displaying the second decision point, a step of periodic calculation, updating and display of a trajectory for rejoining the selected constrained vertical point, from the aircraft, a step of determining the armed status of the managed vertical guidance mode, if the managed vertical guidance mode is armed, a final step of rejoining the constrained vertical point selected according to a limit flight criterion, if the managed vertical guidance mode is not armed, a repetitive step of determining the passing of the second vertical decision point by the aircraft, step of sequencing the selected vertical constrained waypoint of the flight plan, the step of emitting an alert indicating that an unsatisfied vertical constraint has just been sequenced.

12. The method according to claim 3 carrying out as soon as is valid a condition defined by the fact that:

the said aircraft is not slaved to the vertical profile and that a vertical discrepancy between the position of the aircraft and the scheduled vertical profile of the active flight plan exceeds a second threshold, the following repetitive sequential steps:

a step of testing for vertical divergence of the trajectory of the aircraft with respect to the active segment of the vertical profile, a step of selecting a vertical constrained waypoint of the flight plan that the aircraft must rejoin, the first determining step, suitable for determining a first vertical decision point allowing the rejoining of the selected vertical constrained waypoint, according to an optimal flight criterion making it possible to satisfy the constraint attached therewith, the displaying step, suitable for displaying the first decision point, a step of determining passing of the first vertical decision point by the aircraft, a step of emitting an alert indicating the passing of the first vertical decision point, a step of determining the arming of a managed vertical guidance mode, making it possible to satisfy the lateral or vertical or temporal constraint of the constrained waypoint, if the managed vertical guidance mode is armed the method comprises the following step:

a final step of engaging the previously armed managed vertical guidance mode allowing the rejoining of the constrained lateral point selected according to an optimal flight criterion, if the managed vertical guidance mode is not armed the method comprises the following steps:

a step of sequencing the selected vertical constrained waypoint of the flight plan, a step of emitting an alert indicating that the unsatisfied selected vertical constraint has just been sequenced.

13. The method according to claim 1, in which at least one of the said criteria depends on at least one parameter chosen from among:

a first parameter representative of a horizontal rejoining angle between the flight plan and the rejoining trajectory, a second parameter representative of an angle of roll, a third parameter representative of a speed of the aircraft making it possible to increase the flight slope, a fourth parameter representative of the thrust of the engines of the aircraft, a fifth parameter representative of an extended configuration of the airbrakes.

14. A flight management system configured for the implementation of the method according to claim 1.

* * * * *